June 25, 1968  M. P. LEBOURG  3,389,752
ZONE PROTECTION
Filed Oct. 23, 1965  2 Sheets-Sheet 2
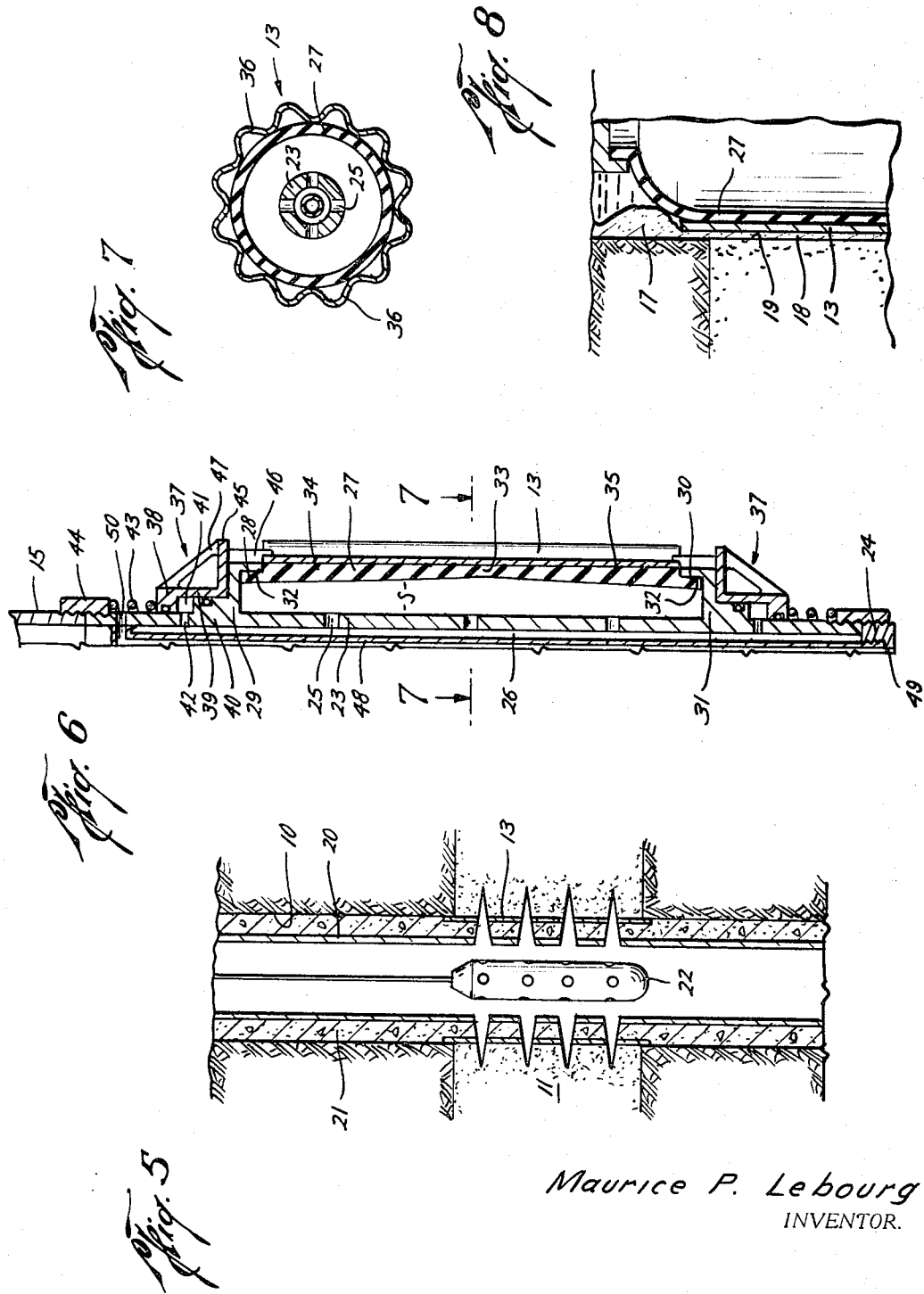
Maurice P. Lebourg
INVENTOR.

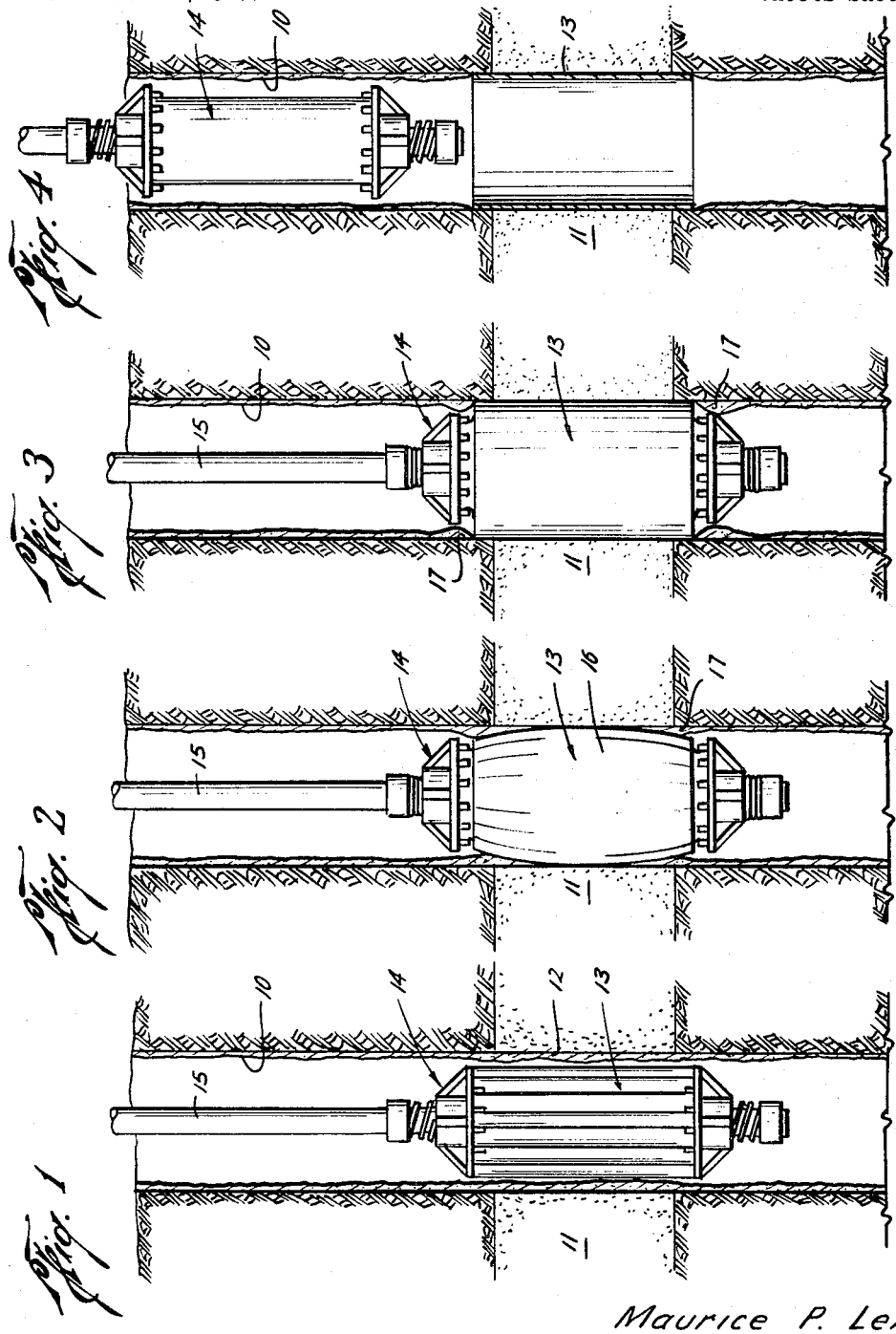

United States Patent Office 3,389,752
Patented June 25, 1968

3,389,752
ZONE PROTECTION
Maurice P. Lebourg, Houston, Tex., assignor, by mesne assignments, to Schlumberger Technology Corporation, Houston, Tex., a corporation of Texas
Filed Oct. 23, 1965, Ser. No. 503,471
4 Claims. (Cl. 166—46)

ABSTRACT OF THE DISCLOSURE

Methods for completing wells having permeable and porous formation zones which may be damaged by invasion of cement including steps of forcing an impermeable lining into intimate contact with filter cake on the formation wall, permitting differential sticking of the lining on the wall, then running and cementing casing in the well bore, and perforating through the casing, cement and lining.

---

This invention relates generally to oilwell completion methods and, more particularly, to the utilization of liners in a well bore to seal and thereby protect a formation zone from the adverse effects of cementing operations.

It is generally known that certain types of commercially interesting oil-bearing formations are damaged and their ability to satisfactorily produce seriously impaired by cementing operations conducted during completion of the well. For example, low pressure, highly permeable or fractured zones are easily damaged by cement solids or may be contaminated by filtrate. Reef or carbonate formations of vugular or fractured types are adversely affected by penetration of cement solids into the voids. Some formations contain water sensitive components that swell, expand or disintegrate when in contact with cement slurry filtrate, resulting in decreased permeability. When the aforementioned formation damage occurs the formation fails to produce as anticipated based on such productivity indicators as drillstem test data. Expensive and time-consuming re-perforating or other stimulation is then required before satisfactory completion can be attained. In some cases, the zone may have to be abandoned.

It is therefore an object of this invention to provide a method of, and apparatus for, completing a well wherein selected formation zones are protected from damage due to cementing operations.

A further object of the invention is to provide a method of, and apparatus for, preventing formation damage during cementing operations, both method and apparatus being simple and effective to afford overall cost savings in oil recovery operations.

These and other objects are attained in accordance with the principles of the present invention wherein, prior to cementing casing in a well bore, a permeable and porous formation zone which may be damaged by cement is sealed off by an impermeable lining which is forced into contact with filter cake formed on the well bore wall. The lining will then be held in sealing engagement due to the phenomenon of "differential sticking," and will prevent invasion of the formation by cement. Fluid flow from the protected zone into the casing may be later established by perforating through the casing, cement and lining.

The novel features of the present invention are set forth with particularity in the appended claims. The invention, both as to the process steps involved and suitable apparatus for practice of the process, together with the further objects and advantages thereof may best be understood by way of illustration and example when taken in conjunction with the accompanying drawings in which:

FIG. 1 is a sectional view of the well bore showing an expandable seal and setting tool therefor positioned adjacent the formation to be protected from cement damage;

FIG. 2 is a sectional view of the well bore showing the initial setting phase of the expandable seal;

FIG. 3 is a sectional view of the well bore showing the final setting phase and wherein the setting tool of the invention is fully inflated and the expandable seal in place against the formation wall;

FIG. 4 is a sectional view of the well bore showing the setting tool deflated and being withdrawn from the well and the expandable seal remaining in place;

FIG. 5 is a sectional view of the well bore showing casing cemented therein with the expandable seal protecting the adjacent formation from cement damage;

FIG. 6 is an elevational half-sectional view of one embodiment of apparatus for practicing the method of the present invention, the section taken on line 6—6 of FIG. 1;

FIG. 7 is a section on line 7—7 in FIG. 6; and

FIG. 8 is an enlarged fragmentary sectional view of the expandable seal adjacent the zone wall.

With reference to FIG. 1, numeral 10 indicates a well bore extending downwardly through a permeable formation zone 11 which is to be protected from cement damage. The well bore contains the usual column of drilling mud for control of formation pressures and numeral 12 indicates the filter or "mud" cake which is deposited on the walls of permeable formation zone 11. Means for sealing the formation zone 11, in the form of an expandable liner 13 made of an impermeable, yet elastic and flexible material, is attached to an inflatable setting tool 14, the combination inflatable setting tool and expandable liner being suspended in the well bore on a tubular running-in string 15.

Turning now to FIG. 2, liner 13 is shown being expanded out into sealing engagement with the walls of the formation zone 11 by the introduction of pressure into the inflatable setting tool 14 through the running-in string 15. To effectively seal the formation, the setting tool, to be more fully described below, is so designed that as pressure is increased therein the circumferential mid-portion 16 of liner 13 is the first portion of the liner to contact the filter cake on the zone wall. As setting of the liner continues, it is progressively pressed out against the filter cake from the mid-portion of the liner toward either end. As shown generally in FIG. 3 and in more detail in FIG. 8, a movable portion 17 of the filter cake is displaced or squeezed out from behind the liner so that the liner is forced into firm contact with the portion 18 of the filter cake remaining between the liner 13 and formation zone wall 19. In this manner the entire peripheral area of the liner is placed adjacent the zone wall 19 to effect a seal.

Due to the differential pressure between the mud column and the formation fluid, the impermeable liner 13 will stick adjacent the wall of formation zone 11 due to the hydraulic phenomena generally denoted as "differential sticking" and discussed in "Mechanics of Differential Pressure Sticking of Drill Collars," H. D. Outmans, 1958 Journal of Petroleum Technology, vol. 213, p. 265. Briefly described, the mechanics of the sticking are such that when the liner is forced into contact with the filter cake, the flow of filtrate from the drilling mud in the well bore 10 into the isolated area behind the liner 13 is shut off. Filtrate in the cake will continue to flow into the formation, but since no filtrate can enter the cake, its water content decreases. Decrease in water content in the isolated part of the cake is accompanied by a reduction in porosity and hence in volume. In other words, the cake between the liner 13 and the formation wall 19 shrinks as the water is squeezed out of the cake into the formation. As the water content decreases the hydraulic stresses throughout the cake decrease until they become substantially equal to the formation fluid pressure. When this action has occurred, the pressure differential between the mud column pressure and the formation fluid pressure will act radially outwardly across the entire peripheral area of the impermeable liner 13 to hold the liner in firm sealing engagement over the zone wall 19 without the need for an anchoring device, thereby protecting the formation zone from invasion by cement slurry or filtrate.

Furthermore, as the filter cake shrinks, the diameter of the liner 13 increases and the mud column pressure acts over an increasingly greater peripheral area of the liner. Thus, the liner 13 becomes increasingly more stuck adjacent the formation zone wall and greater forces will be required to dislodge the liner therefrom. As shown in FIG. 4, setting tool 14 is deflated by bleeding off pressure therein through running-in string 15. After deflation, the setting tool is withdrawn, leaving liner 13 in place.

With the formation thus sealed and protected, casing 20 can now be run through the sealed zone and cement slurry displaced down through the casing and up through the annular space between the casing and the sealed zone. As shown in FIG. 5, flow of connate fluids from formation 11 into the casing 20 is established by perforating through casing 20, cement 21, liner 13 and into the sealed zone by a perforator 22 in a well-known manner.

Apparatus suitable to perform the method is shown in FIG. 6. Inflatable setting tool 14 has a central body including a mandrel 23 which is threadedly coupled at its upper end to running-in string 15 and closed at its lower end by a plug 24. A plurality of ports 25 extend through the mandrel wall and provide communication between the bore 26 of the mandrel and the annular space S enclosed by a sleeve or bladder 27 made of rubber or other elastomeric material. The sleeve 27 is attached to mandrel 23 at an upper end 28 by cap member 29 and at a lower end 30 by cap member 31, the joints 32 between the ends of the sleeve and the caps being hermetically sealed in a suitable manner. The wall thickness of sleeve 27 increases gradually from the thinnest portion 33 at its mid-portion to thicker portions 34, 35 near each end, thereby permitting control of the progress of inflation of the sleeve.

A tube 48 is provided for by-passing fluids through the inflatable setting tool 14 as it is being shifted longitudinally through the fluid-filled well bore. The tube 48 communicates with a port 49 in the plug 24 and extends upwardly through mandrel 23 to a second port 50 above the upper cap member 29, thereby placing the spaces above and below the setting tool 14 in communication.

Attached to the exterior of setting tool 14 is the expandable seal or liner 13 made of a flexible yet impermeable material such as a cylindrical sheath of a soft steel or other metal having approximately a $\frac{1}{16}''$ wall thickness. Alternatively, a cylindrical sheath of a suitable plastic can be used. The inside surface of the liner may be suitably prepared for optimum bonding to cement by sandblasting or the like. To reduce the outside diameter of liner 13 so that it may be expeditiously run into the well bore, longitudinal folds or corrugations 36 may be made therein as shown in FIG. 7.

Upper and lower means 37 for releasably attaching the liner 13 to the exterior of setting tool 14 are provided. Both means being identical in construction, only the upper means will be described. An annular sleeve piston 38 is slidably disposed about mandrel 23. Piston 38 is secured to a tubular skirt 39 which extends slidably over the exterior of head 40 above cap member 29. The length of skirt 39 is such as to provide a sealed expansible pressure chamber 41 between the upper end of head 40 and piston 38. Ports 42 extend through the wall of mandrel 23 and provide communication between the interior of the mandrel and pressure chamber 41. Alternatively, vertical ports (not shown) may be provided through the cap member and head to place chamber 41 in communication with the space S between the sleeve and mandrel. A helical compression spring 43 is disposed around mandrel 23 between the top of piston 38 and tubing collar 44. Extending outwardly from the lower end of skirt 39 is an annular flange 45 having an outside diameter at least as great as the reduced diameter of liner 13 so that any obstructions met while lowering the apparatus into the well bore will not act to dislodge the liner from the setting tool. Depending downwardly from flange 45 are a plurality of notched retaining fingers 46 which engage the ends of liner 13 and securely hold it in place on the setting tool. Brace members 47 may be provided to aid in passing borehole obstructions.

In operation, the structural organization of parts shown in FIG. 6 is lowered into well bore 10 and positioned adjacent the formation to be protected 11. A suitable pressure medium is introduced down through running-in string 15 and passes through ports 25 into the space S, thus acting to expand sleeve 27. It will be appreciated, of course, that the apparatus could be run on a wireline and a downhole pump used to inflate the sleeve.

As mentioned above, due to variation in cross-sectional thickness of sleeve 27, expansion will begin at mid-portion 33 and progress toward each end. The mid-portion of expandable seal or liner 13 will therefore be the first portion to engage the filter cake 12 on the formation wall and sleeve 27 will act to apply the liner from its mid-portion toward both ends. This mode of applying the liner, as previously explained, will act to displace a moveable portion of the filter cake from behind the liner and expedite the forming of a good seal.

The aforementioned pressure, transmitted via ports 42, moves pistons 38 against springs 43 to disengage the notched fingers 46 from the ends of the liner 13. This releases the liner from the setting tool 14 for applying the liner to the formation wall. Continued application of pressure to setting tool 14 will fully inflate sleeve 27 and firmly press the entire outer surface of liner 13 into sealing engagement adjacent the formation zone wall 19.

Setting tool 14 is deflated for removal by bleeding off pressure from within sleeve 27 through running-in string 15. The elastomeric sleeve member 27 will return to its normal, unstretched size and the setting tool can be withdrawn from the well.

In practicing the method, after the well is drilled and before casing is run and cemented, the inflatable setting tool and an expandable liner are lowered into the well bore until the liner is adjacent a selected hydrocarbon-bearing formation susceptible to damage by cementing operations. The setting tool is then actuated to expand the liner out against, and into sealing engagement with, the formation wall. Controlled expansion of the liner acts to displace a movable portion of the filter cake on the formation wall so that an effective seal is made by the liner. When the liner comes into contact with the filter cake, the filtrate flow is shut off and differential sticking is permitted as heretofore described. If desired, the setting tool is maintained in its fully inflated condition for a period of time to insure stabilization of filter cake fluid pressure and formation fluid pressures behind the liner.

The setting tool is then deflated and withdrawn from the well bore, leaving the liner in place. The pressure differential between hydrostatic mud column fluid pressure and formation fluid pressure acts to hold the impermeable liner in place and effectively seal the formation zone. Casing may now be run through the zone and cemented in place, the liner preventing contact between the cement slurry and the formation and thereby protecting the formation from cement damage. To complete the well, perforations may be made through the casing, cement and liner so that flow of connate fluids from the formation into the casing is permitted.

It will be readily seen that a method and apparatus for completing a well have been disclosed wherein formation zones can be protected from damage during cementing operations. The invention is simple and effective and will afford overall cost savings in oil recovery operations by eliminating the need for remedial work to attain satisfactory production from formation zones which have sustained cement damage. Since certain changes may be made without departing from the scope of the inventive concept involved, it is intended that all matter contained in the above description or shown in the accompanying drawings shall be interpreted as illustrative and not in a limiting sense.

What is claimed is:

1. A method of completing a well comprising the steps of: sealing off a selected zone traversed by a well bore with an impermeable sealing medium, thereby protecting it from invasion by cement slurry or filtrate; running and cementing casing through the sealed zone in the well bore; and perforating the casing, cement and sealed zone.

2. A method of completing a well comprising the steps of: lining the walls of a formation zone traversed by a well bore with an impermeable seal to substantially isolate fluids or filtrate in the well bore from the formation; running and cementing casing through the lined zone in the well bore; and perforating through the casing and cement and into the lined zone.

3. A method for completing a well comprising the steps of: expanding an impermeable liner into engagement with the filter cake adjacent the formation wall over a selected zone while displacing a movable portion of the filter cake from the formation wall; running and cementing casing through the selected zone in the well bore, and perforating through the casing, cement and liner and into the selected zone.

4. A method of sealing a permeable and porous formation zone having a filter cake on the wall thereof comprising the steps of: positioning an impermeable liner in said zone; expanding the impermeable liner into engagement with the filter cake; and controlling the progress of expansion of the liner to progressively displace a movable portion of the filter cake, so that pressure differentials between hydrostatic well fluid pressures and formation fluid pressures will act to hold the liner adjacent the zone wall in effective sealing engagement.

References Cited

UNITED STATES PATENTS

| | | | |
|---|---|---|---|
| 341,327 | 5/1886 | Fay | 166—207 |
| 1,233,888 | 7/1917 | Leonard | 166—46 |
| 1,880,218 | 10/1932 | Simmons | 166—207 X |
| 2,583,316 | 1/1952 | Bannister | 166—207 X |
| 2,796,134 | 6/1957 | Binkley | 166—207 |
| 2,812,025 | 11/1957 | Teague et al. | 166—207 |
| 3,067,819 | 12/1962 | Gore | 166—46 X |
| 3,167,122 | 1/1965 | Lang | 166—207 X |

CHARLES E. O'CONNELL, *Primary Examiner.*

DAVID H. BROWN, *Examiner.*